United States Patent [19]
Thompson et al.

[11] 3,922,631
[45] Nov. 25, 1975

[54] UNDERWATER INTRUSION DETECTING SYSTEM

[75] Inventors: John H. Thompson, Pittsburgh, Pa.; David S. Sims, Ellicott City, Md.

[73] Assignee: The United States of America as represented by the Secretary of the Navy, Washington, D.C.

[22] Filed: June 20, 1960

[21] Appl. No.: 37,535

[52] U.S. Cl. .................. 340/3 R; 340/3 C
[51] Int. Cl.² .......................... G01S 9/68
[58] Field of Search .......... 340/3, 6, 2, 5, 3 C; 181/0.51

[56] References Cited
UNITED STATES PATENTS

| | | | |
|---|---|---|---|
| 1,473,332 | 11/1923 | Benson | 340/6 R |
| 2,009,459 | 7/1935 | Turner, Jr. | 340/3 R |
| 2,399,017 | 4/1946 | Goldman | 340/6 R |
| 2,401,929 | 6/1946 | Hammond, Jr. | 340/3 R |
| 2,418,846 | 4/1947 | Meacham | 340/3 R |
| 2,987,068 | 6/1961 | Branson | 340/3 R |

OTHER PUBLICATIONS
German Printed Application, 1,072,162, Kunze et al., Dec. 24, 1959, 4 pp. Spec., 2 Shts. Dwg.

*Primary Examiner*—Richard A. Farley
*Attorney, Agent, or Firm*—Louis A. Miller; Rolla N. Carter

EXEMPLARY CLAIM

1. An acoustic barrier for detecting and classifying a body intruding into a protected volume of water comprising a high resolution active sonar apparatus including a transmitting transducer submerged in the protected volume of water and having a vertically oriented fan shape directivity pattern with its principal axis slanted toward a bounding surface, means for rotating said transmitting transducer in azimuth about a vertical axis, means for pulsing said transmitting transducer $t$ times per second, and means for displaying in PPI presentation the flutter echoes returned from said bounding surface with spot positions in the presentation being functions of the azimuth and slant ranges of the echo origins, said displaying means including a receiving transducer having a vertically oriented fan shape directivity pattern with its principal axis slanted toward said bounding surface and a beam width in azimuth in degrees equal to $2\theta$, and said receiving transducer being mounted for rotation in assembly with said transmitting transducer and being so oriented that its principal axis lags behind the principal axis of said transmitting transducer by an azimuthal angle of $\theta°$ where $$\theta = \omega \div t$$

wherein $\omega$ equals the angular velocity in degrees per second at which said transducers are rotated.

4 Claims, 5 Drawing Figures

John H. Thompson
David S. Sims
INVENTORS

BY

UNDERWATER INTRUSION DETECTING SYSTEM

The present invention relates to the underwater surveillance of harbor and channel areas and the like and more particularly to an active catacoustic system for detecting and classifying a body intruding in a volume of water being protected.

An object of the invention is to provide a continuous visual display of the position and depth of a body intruding in the water volume under surveillance.

Another object of the invention is to provide a visual display containing information concerning the dimension of a vertical plane profile of such an intruding body.

A further object of the invention is to provide a visual display indicating changes in position of such an intruding body and the dimension of a profile of such body in a horizontal plane.

Still another object of the invention is to provide a utilization circuit which is energized whenever a body intrudes into the protected volume of water.

Acoustic echo detecting and ranging apparatus including means for operating a plan position indicator (PPI) have been proposed, as evidenced by U.S. Patent No. 2,418,846 to L. A. Meacham, for providing a continuous visual indication of the movement of surface craft and submarine vessels within a given area as viewed from a stationary position near the bottom of a bay or the like. In this and similar arrangements, reflections from the bounding surfaces constitute reverberation which becomes the limiting background noise for a system utilizing such a scheme. Under low sea state conditions the background noise is low whereas under adverse surface conditions target echoes are masked by the reverberation and the system becomes relatively useless at a time when the probability of submarine threat might appropriately be high.

In accordance with the present invention, flutter echoes returned from a bounding surface no longer constitute undesirable reverberation but rather become a well defined function of the presence of a target or intruding body. Surface return echoes are converted into useful allies by utilizing a PPI type of system comprising a highly directive transducer array that is continuously rotated to scan a surface bounding the protected water volume, the presence of an intruding body being indicated by a discontinuity in the return of echoes reflected from such surface. The manner in which such discontinuities indicate an intruding body is fully described in our application Ser. No. 12652 filed Mar. 3, 1960. In accordance with the preferred embodiment of the present invention to be described in detail, a high resolution pulse echo system has a bottom mounted submerged transducer array having a fan shape vertically oriented directivity pattern directed obliquely towards the water surface and is rotated in azimuth about a vertical axis. When the transducer is pulsed, the resulting acoustic signal pulse transmitted toward the surface is reflected by the surface from the region along the line of intersection of the directivity pattern with the surface and will arrive at the transducer at a time following the transmission corresponding to the appropriate slant range. If the pulse width is made sufficiently short, then the resulting high slant-range resolution will cause the surface reverberation to appear discrete in nature so that the surface reverberation will appear in a PPI presentation as background "snow" of TV-like character.

The volume of water traversed by the acoustic energy returned to the receiver in one complete rotation of the transducer constitutes the protected volume to be kept under surveillance. When this protected volume is unoccupied, each flutter echo return from the surface will be displayed as low intensity markings substantially uniform along each radial scan line and will appear somewhat discrete due to the high slant-range resolution provided by the short width of the transmitted pulses, say 3 inches in water.

The invention will be better understood from the following description taken in connection with the accompanying drawing in which.

Figure 1:
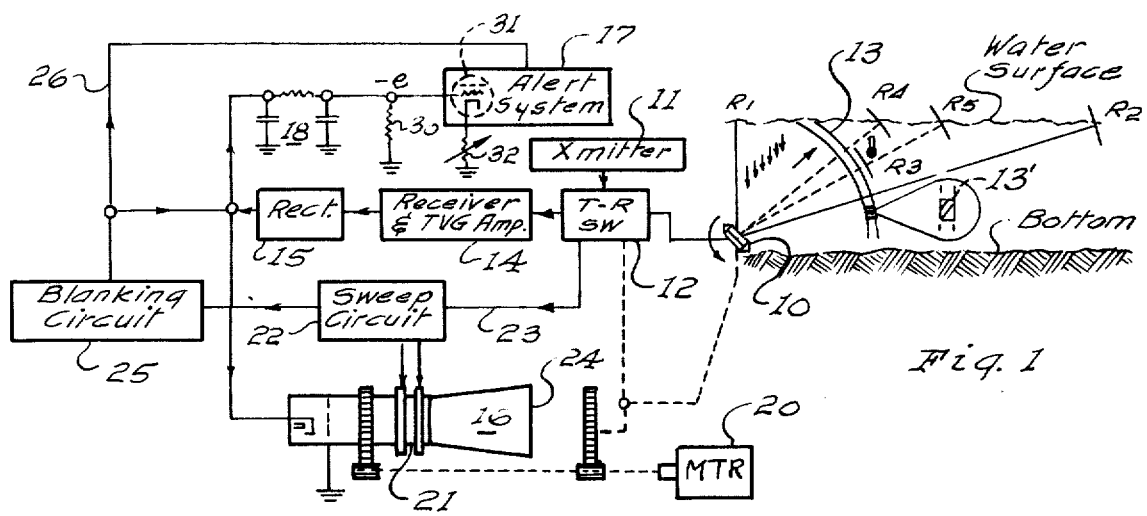
FIG. 1 is a diagrammatic showing of an acoustic surveillance system embodying the invention.

The apparatus incorporating the invention shown in FIG. 1 comprises a rotatable directive transducer 10, a transmitter 11 adapted to be periodically connected through a transmit-receive switch 12 to pulse the transducer 10 to emit short acoustic pulses 13 having a rectangular cross-section as indicated at 13'. The intersection of each pulse 13 with the water surface wipes or travels outwardly along the surface so that the return flutter echo signal due to surface reflection is comparable to that received from flying spot scanning. This echo signal received by the transducer 10 is passed by the T-R switch 12 to a receiver 14 which includes a time varied gain amplifier for maintaining substantially constant its output for application after being rectified by a rectifier 15 to the cathode of a cathode ray indicator tube 16 and to an alerting system 17 through a time constant network 18.

The transducer 10 is rotated at a uniform speed about a vertical axis by means of a motor 20 which also controls the T-R switch 12 and rotates a deflecting yoke 21 on the indicator tube 16 at the same speed as and in synchronism with the transducer rotation. Radial deflection of the electron beam of the tube 16 is produced by means of recurring sawtooth pulses of current supplied to the yoke 21 from a sweep circuit 22. The sweep circuit 22 is synchronized with the transmission of pulses 13 by pulses supplied over a conductor 23 from the T-R switch 12. With this arrangement, echo signals supplied by the rectifier 15 to the tube 16 will produce a bright spot on a fluorescent screen 24 at a point corresponding to the slant range origin of each return echo. In accordance with common practice, the return trace in the tube 16 is blanked by means of a blanking circuit 25 under the control of the sweep circuit 22. This blanking circuit 25 also functions via a lead 26 to disable the alerting system 17 during each period the tube 16 is blanked.

Figure 2:
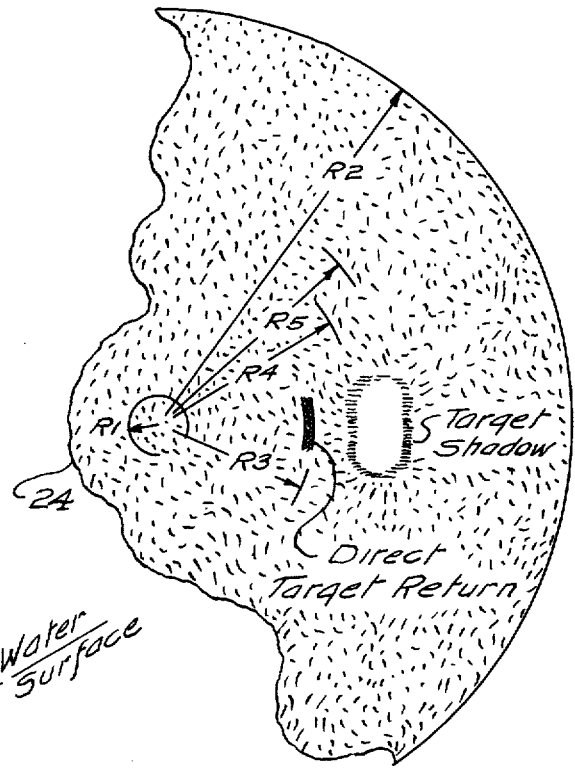
FIG. 2 is a fragmentary view of the PPI presentation resulting from the situation illustrated in FIG. 1.

With the receiver 14 adjusted so that the relatively weak signals derived from surface reflections will be lightly displayed on the fluorescent screen 24, stronger signals as from intruding bodies will be more intensely displayed and there will be no display when the intruding body casts an acoustic shadow on the surface. These relationships will be more clearly envisioned by referring to the fragmentary display shown in FIG. 2 which would result from the presence of a submerged stationary target as shown in the vertical plane in FIG. 1. In FIG. 1, a transmitted pulse 13 is shown traveling outward as indicated by the large arrow and the return or flutter echoes from the surface are indicated by a plurality of small arrows. The return from the pulse 13 between slant ranges $R_1$ and $R_4$ is from the surface and thus appears as a low intensity signal. At slant range $R_3$, a direct target return of high intensity appears in the signal and since the target casts a shadow on the surface, little or no reflection will be returned for the times corresponding to the slant range falling between $R_4$ and $R_5$. Thereafter, the return between the slant ranges $R_5$ and $R_2$ will be represented by low intensity signals. Assuming the target has a finite length and shape and the transducer 10 is rotating, then the PPI presentation of the target will appear as illustrated in FIG. 2. The direct target return from the range $R_3$ will consist of a series of high intensity coherent dots which will appear as a curved line while the shadow between the ranges $R_4$ and $R_5$ will appear as a lack of signal as shown. The target size and shape as well as its depth and position can be estimated from the PPI presentation. Provided the transducer 10 is rotated sufficiently fast, it follows that a moving target can be detected and classified just as easily as in the case of the stationary target cited above. Further, with the preferred high slant-range resolution, a surface target with some draft will produce a shadow in the same manner as a submerged target.

In situations where slow transducer rotational speeds would satisfy system parameters, a single transducer may be utilized for both transmission and reception of the acoustic energy; however, it is expected that higher rotational speeds would usually be necessary or at least highly desirable so that two transducers would be utilized with the receiving transducer lagging the transmitting transducer.

Figure 4:
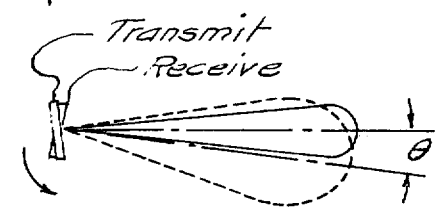
FIG. 4 is a representation of the directivity patterns which may be employed when separate transmit and receive transducers are utilized.

As indicated in FIG. 4, when a two transducer array is utilized it is preferred to employ for transmission a transducer having a beam width narrow in azimuth for providing the definition or resolution of the system in azimuth since during the very short transmission time, e.g., 50 microseconds, the transducer array can for practical purposes be considered stationary whereas the receiving transducer must respond to the echo return for a relatively long interval of time, e.g., .05 seconds when the greatest slant range to be displayed is 120 feet. It is thus apparent that the width of the receiver beam for comparable reception at different speeds of rotation is a function of the speed of its rotation and its principal axis should lag the principal axis of the transmitting transducer by an angle $\theta$ of such size that the return from slant range $R_2$ is received axially. from the the angular beam width for the receiver should be $2\theta$ where $$\theta = \omega t$$

wherein $\omega$ is the angular velocity in degrees per second and $t$ is the reciprocal of the pulse repetition rate per second. In a system utilizing a pulse repetition rate of 20 per second, if the angular velocity of the rotating transducer array is 120° per second, the principal axis of the receiving transducer should lag 6° behind the principal axis of the transmit transducer and a complete display appears on the screen 24 every 3 seconds, i.e., a frame frequency of 1 per 3 seconds. In this system, the receiver beam width at the −3db points should thus preferably be 12°.

Figure 3:
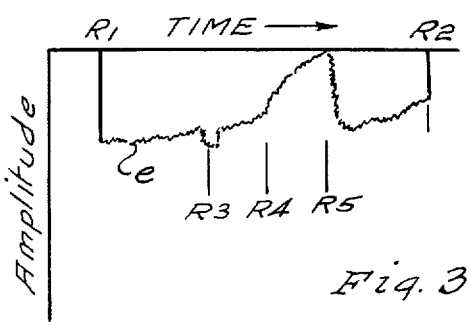
FIG. 3 shows the signal variation with time after processing for the alerting circuit shown in FIG. 1.

The flutter echo return during the scanning cycle shown in FIG. 1 will provide across the input resistor 30 for a triode 31 in the alerting system 17 a negative voltage e which varies in amplitude as represented in FIG. 3. A variable resistance 32 in series with the cathode of the triode 31 is adjusted so that the alerting system 17 responds when the voltage e drops to the level representative of a "shadow" return. The time constant network 18 smooths out the high frequency fluctuations which produce the "snow" on the screen 24 so that only relatively long periods of low signal will result in energizing the alerting system 17. It will of course be understood that any relay of the slow-make type may be employed for energizing the alerting system 17 and that the alerting system 17 may perform one or more functions such as alerting an operator, photographing one or more frames of the display after an initial delay sufficient to complete the scansion of an expected target, and the like.

Figure 5:
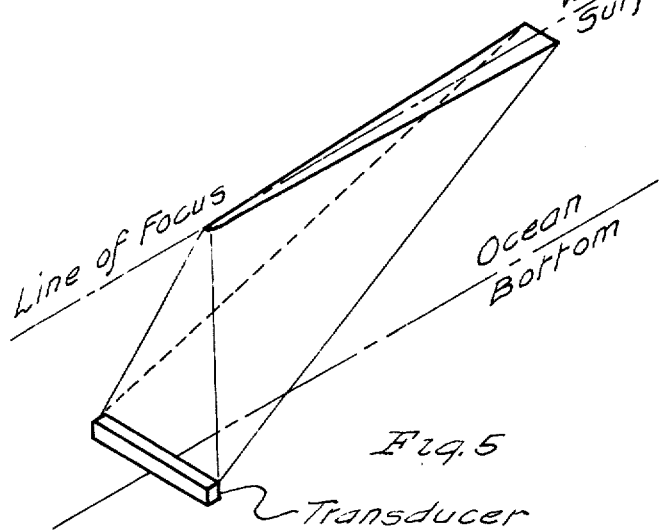
FIG. 5 shows in perspective the energy distribution from a special focused transducer.

The transmitting transducer may be of any high resolution type having a fan shape directivity pattern but is preferably of the focused type disclosed by C. H. Jones in his application Ser. No. 20230 filed Apr. 5, 1960 and assigned to the assignee of the present invention. The transducer therein disclosed is elongated along a circle of latitude having a radius equal to the distance from a plane surface the transducer is to operate so that when it is energized in phase it transmits compressional wave energy focused along a narrow strip on the plane surface, i.e., along the polar axis defined by such circle of latitude. FIG. 5 shows in exaggerated perspective a typical beam from such a transducer oriented on the ocean bottom such that its line of focus falls on the ocean surface. As can be noted, the energy from the transducer converges to the line of focus and hence resolution is obtainable which is smaller than the dimension of the transducer.

It is to be understood that the water volume protected by the invention may be an upright cone rather than the inverted cone illustrated in FIG. 1 by submerging the transducer array 10 from a surface platform with its directivity pattern directed obliquely to the bounding surface provided by the ocean bottom; also, that as many surveillance systems as desired may be grouped in such manner as to keep under surveillance the water volume of any desired area. It will also be evident to those skilled in the art that the transducer array 10 may be indexed between scanning cycles rather than rotated continuously.

The above description of the functioning of the apparatus assumed that a body intruding in an object field being watched would provide a more highly reflecting target than the water surface. It is known that acoustic absorptive coatings are constantly being sought for use on submarines and the like in an effort to reduce their target strength and hence make them more difficult to detect and it is possible that such coatings may be developed which would be effective enough to reduce the direct return from such a coated surface to a level which would be masked by the background. Under such conditions, systems depending only on the target return or echo would become useless. However, such a coated submarine would still produce a prominent shadow that would furnish positive identification in the system described herein. In fact, if the acoustic coating was effective to absorb 100% of the impinging energy, the submarine would still cast a prominent shadow. The same would be true of any acoustically opaque or perhaps translucent body whose acoustic impedance was properly matched to that of the water so as to reduce its target strength.

From the foregoing detailed description, it will be apparent that the present invention provides an intrusion detecting system which in addition to indicating the mere presence of an intruder in an object field and its time of arrival and departure, provides a visual display from which signifcant information with respect to dimension and whether and to what degree submerged can be extracted at a glance. Further, the underwater surveillance system provided by the invention functions satisfactorily regardless of sea state and employs surface reflections as a well defined function of the presence of an intruder rather than as heretofore trying to design-out surface reflections as undesirable reverberation.

While for the purpose of disclosing the invention preferred embodiments thereof have been described in detail, many modifications and variations are possible and will become readily apparent to those skilled in the art from the foregoing description which is intended to be illustrative only and the scope of the invention is defined in the appended claims.

What is claimed is:

1. An acoustic barrier for detecting and classifying a body intruding into a protected volume of water comprising a high resolution active sonar apparatus including a transmitting transducer submerged in the protected volume of water and having a vertically oriented fan shape directivity pattern with its principal axis slanted toward a bounding surface, means for rotating said transmitting transducer in azimuth about a vertical axis, means for pulsing said transmitting transducer $t$ times per second, and means for displaying in PPI presentation the flutter echoes returned from said bounding surface with spot positions in the presentation being functions of the azimuth and slant ranges of the echo origins, said displaying means including a receiving transducer having a vertically oriented fan shape directivity pattern with its principal axis slanted toward said bounding surface and a beam width in azimuth in degrees equal to $2\theta$, and said receiving transducer being mounted for rotation in assembly with said transmitting transducer and being so oriented that its principal axis lags behind the principal axis of said transmitting transducer by an azimuthal angle of $\theta°$ where $$\theta = \omega \div t$$

wherein $\omega$ equals the angular velocity in degrees per second at which said transducers are rotated.

2. The system set forth in claim 1 wherein said transmitting transducer has a line of focus lying substantially in the plane of said bounding surface.

3. In a pulse-echo catacoustic system for detecting the intrusion of a body into a volume of water comprising water submerged acoustic transducer means having a vertically oriented fan shape directivity pattern with its principal axis slanted toward a surface bounding said volume of water for transmitting an acoustic signal pulse and for receiving flutter echoes returned from said bounding surface for a time interval equal to the transit time of a pulse-echo from a selected maximum slant range, a receiver circuit connected to said transducer means and operative to provide an output signal of substantially constant amplitude from the received flutter echoes, an alerting system, and a time-constant network connected between the output of said receiver circuit and said alerting system for energizing said alerting system whenever the amplitude of said output signal falls below a selected value for an interval of time at least equal to the response time of said network.

4. The system set forth in claim 3 including a cathode ray indicator tube connected to have the intensity of its electron beam controlled by said output signal, and means for unblanking said indicator tube and for enabling said alerting system only during said time interval of flutter echo reception.

* * * * *